United States Patent
Shimura

(10) Patent No.: US 10,459,503 B2
(45) Date of Patent: Oct. 29, 2019

(54) ELECTRONIC SYSTEM, TERMINAL DEVICE, AND FUNCTION EXPANSION DEVICE

(71) Applicant: Fujitsu Client Computing Limited, Kanagawa (JP)

(72) Inventor: Tatsuya Shimura, Kawasaki (JP)

(73) Assignee: Fujitsu Client Computing Limited, Kanagawa (JP)

( * ) Notice: Subject to any disclaimer, the term of this patent is extended or adjusted under 35 U.S.C. 154(b) by 61 days.

(21) Appl. No.: 15/352,205

(22) Filed: Nov. 15, 2016

(65) Prior Publication Data
US 2017/0177050 A1     Jun. 22, 2017

(30) Foreign Application Priority Data
Dec. 22, 2015 (JP) .................................. 2015-250119

(51) Int. Cl.
*G06F 1/26* (2006.01)
*H02J 7/00* (2006.01)

(52) U.S. Cl.
CPC .............. *G06F 1/266* (2013.01); *G06F 1/263* (2013.01); *H02J 7/007* (2013.01); *H02J 7/0068* (2013.01)

(58) Field of Classification Search
None
See application file for complete search history.

(56) References Cited

U.S. PATENT DOCUMENTS

| 5,721,481 | A | | 2/1998 | Narita et al. | |
|---|---|---|---|---|---|
| 6,005,368 | A | * | 12/1999 | Frame | G06F 1/1632 307/53 |
| 6,392,383 | B1 | * | 5/2002 | Takimoto | G06F 1/1632 320/115 |
| 7,545,118 | B2 | * | 6/2009 | Kim | G06F 1/26 320/128 |

(Continued)

FOREIGN PATENT DOCUMENTS

| JP | 03-235626 | 10/1991 |
|---|---|---|
| JP | 08-251830 | 9/1996 |

(Continued)

OTHER PUBLICATIONS

Notice of Reasons for Refusal issued in corresponding Japanese application No. JP2015-250119 dated Jul. 23, 2019 (5 pages).

*Primary Examiner* — Tanh Q Nguyen
(74) *Attorney, Agent, or Firm* — Osha Liang LLP

(57) ABSTRACT

A terminal device includes a state acquisition unit that notifies, when an amount of electric power consumption of the terminal device is small, a docking station of a small electric power consumption state and a power-on management unit that notifies, in response to an instruction to turn on a power supply, the docking station that the power supply is turned on and that starts an electric power supply to a CPU. The docking station includes a charge setting unit that decreases, when a notification of the small electric power consumption state is received from the state acquisition unit, electric power consumption of the docking station when a notification that the power supply is turned on is received from the power-on management unit and increases the electric power consumption of the docking station when the notification that the power supply is turned on is not received from the power-on management unit.

4 Claims, 15 Drawing Sheets

(56) References Cited

U.S. PATENT DOCUMENTS

| | | | |
|---|---|---|---|
| 8,450,979 B2 * | 5/2013 | Kerr | H02J 7/0054 307/46 |
| 9,112,358 B2 * | 8/2015 | Cha | G06F 1/26 |
| 9,939,849 B2 * | 4/2018 | Hirosawa | G06F 1/1669 |
| 2009/0309419 A1 | 12/2009 | Yamasaki et al. | |
| 2017/0177050 A1 * | 6/2017 | Shimura | G06F 1/263 |

FOREIGN PATENT DOCUMENTS

| JP | 2004-229450 A | 8/2004 |
|---|---|---|
| JP | 2009-301281 | 12/2009 |
| JP | 2010-11568 A | 1/2010 |

* cited by examiner

FIG.1
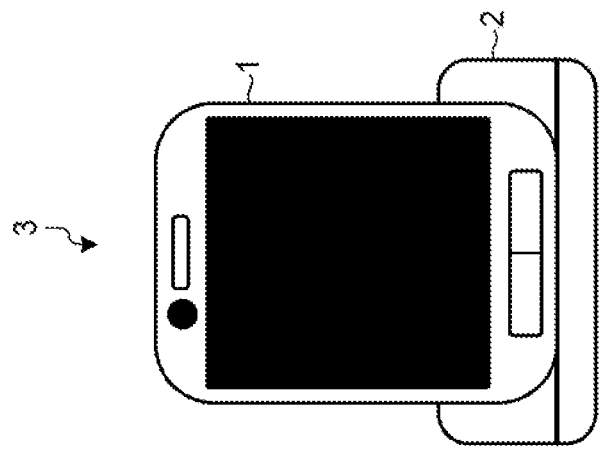
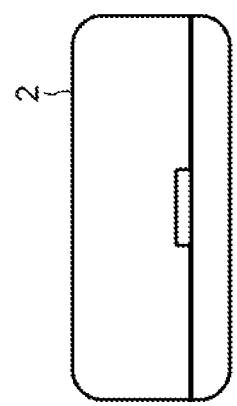
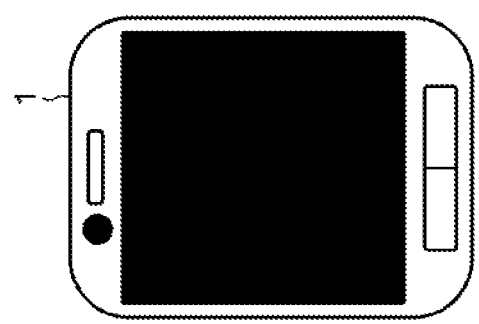

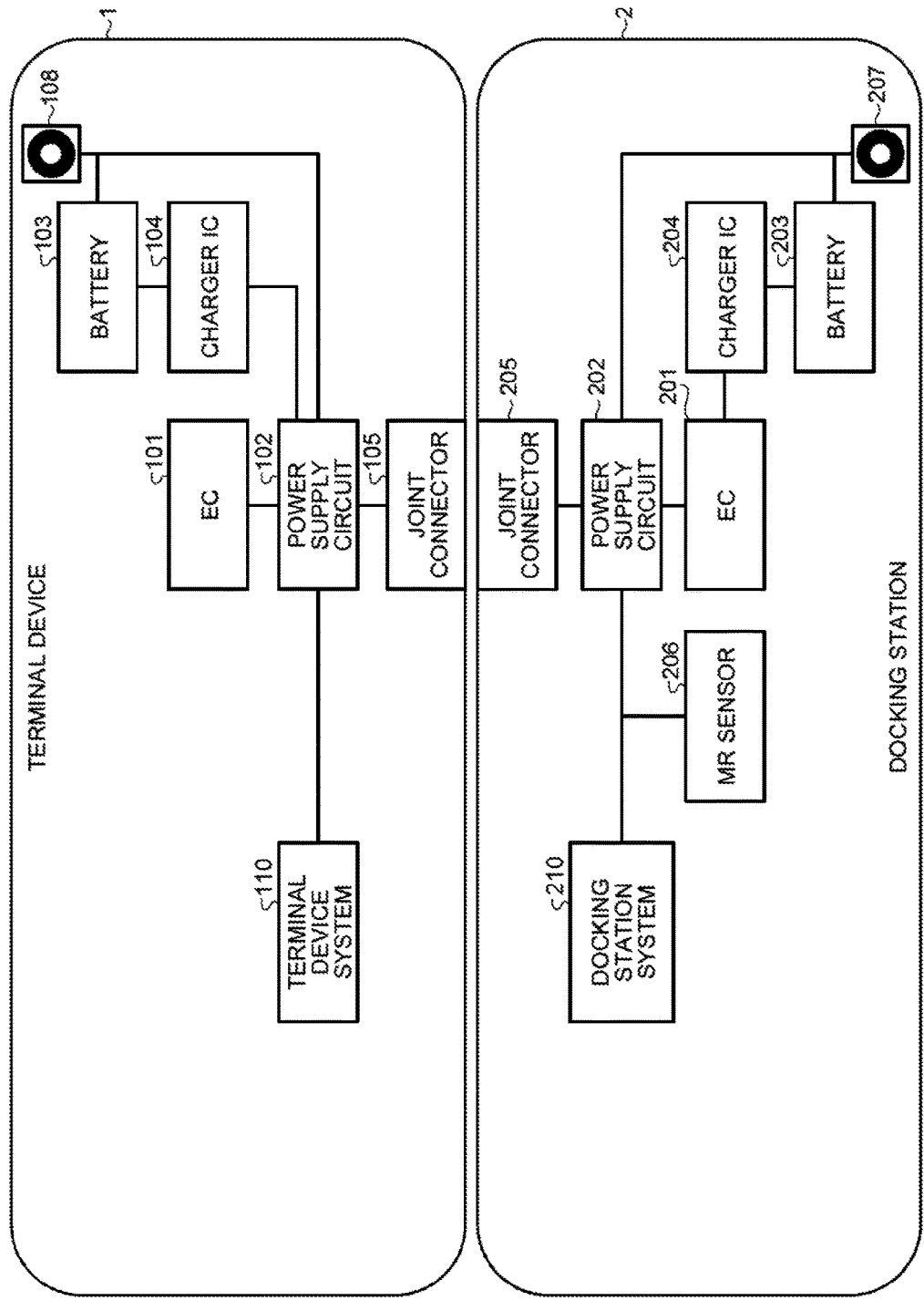

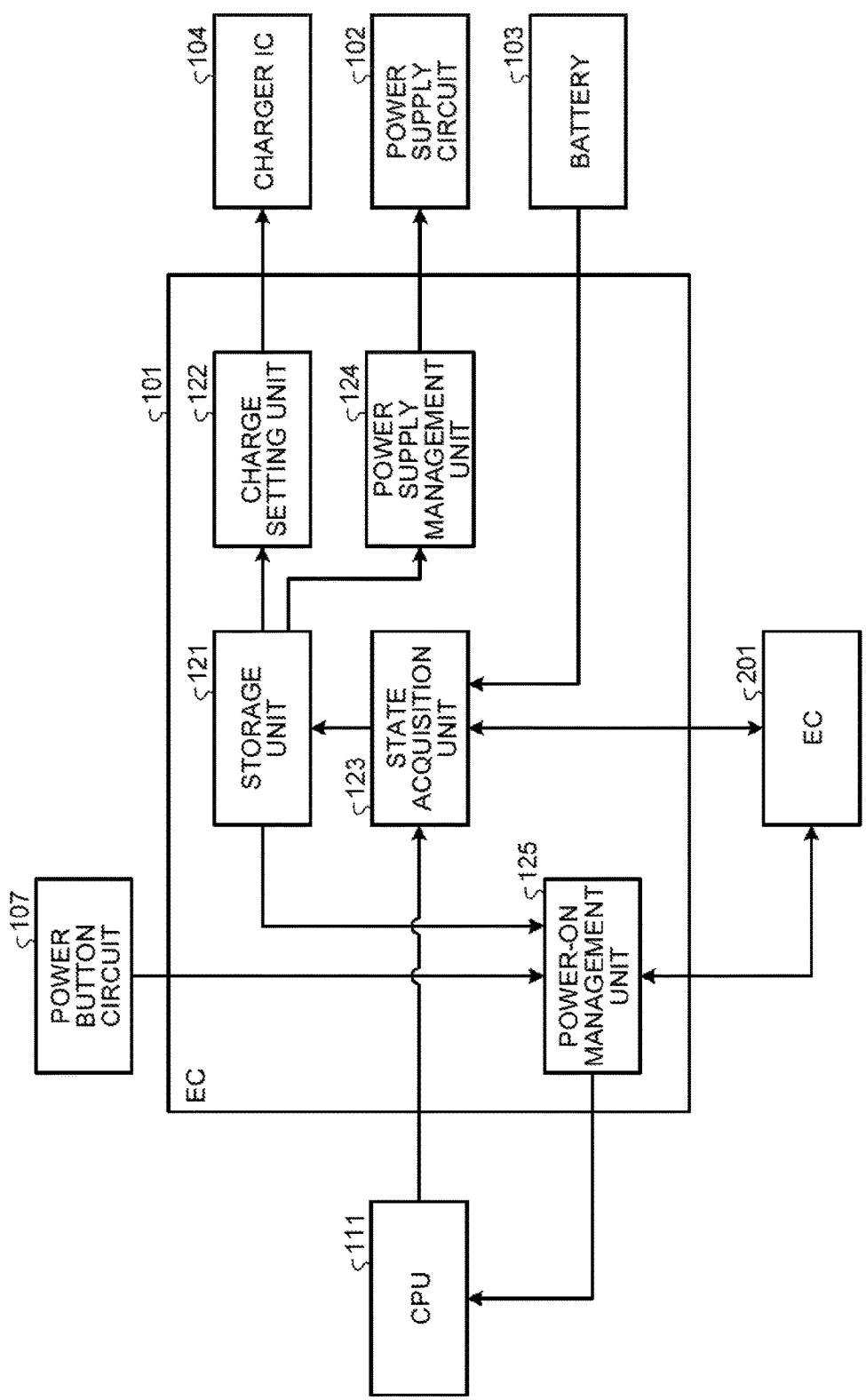

FIG.6

| ACPI STATUS NAME | STATE NAME | TIME TAKEN TO RETURN TO S0 | EXPLANATION |
|---|---|---|---|
| S0 | AT TIME OF OPERATION OF TERMINAL DEVICE | - | STATE IN WHICH ALL OF POWER SUPPLIES USED TO OPERATE TERMINAL DEVICE ARE TURNED ON |
| S3 | SLEEP | SHORT | STATE OF TERMINAL DEVICE IS STORED IN MAIN STORAGE DEVICE AND POWER SUPPLY IS SUPPLIED TO MAIN STORAGE DEVICE |
| S4 | IDLE STATE | MEDIUM | STATE OF TERMINAL DEVICE IS STORED IN AUXILIARY STORAGE DEVICE AND POWER SUPPLY IS SUPPLIED TO AUXILIARY STORAGE DEVICE, ETC. |
| S5 | SHUTDOWN | LONG | STATE IN WHICH POWER SUPPLIES OF ALMOST ALL DEVICES EXCEPT FOR SOME DEVICE (LAN, ETC.) THAT IS SYSTEM RETURN FACTOR AND DEVICE (EC, ETC.) THAT ALWAYS USES POWER SUPPLY ARE TURNED OFF. |
| G3 | SHUTDOWN | LONG | STATE IN WHICH POWER SUPPLIES OF ALMOST ALL DEVICES EXCEPT FOR DEVICE (EC, ETC.) THAT ALWAYS USES POWER SUPPLY ARE TURNED OFF. |

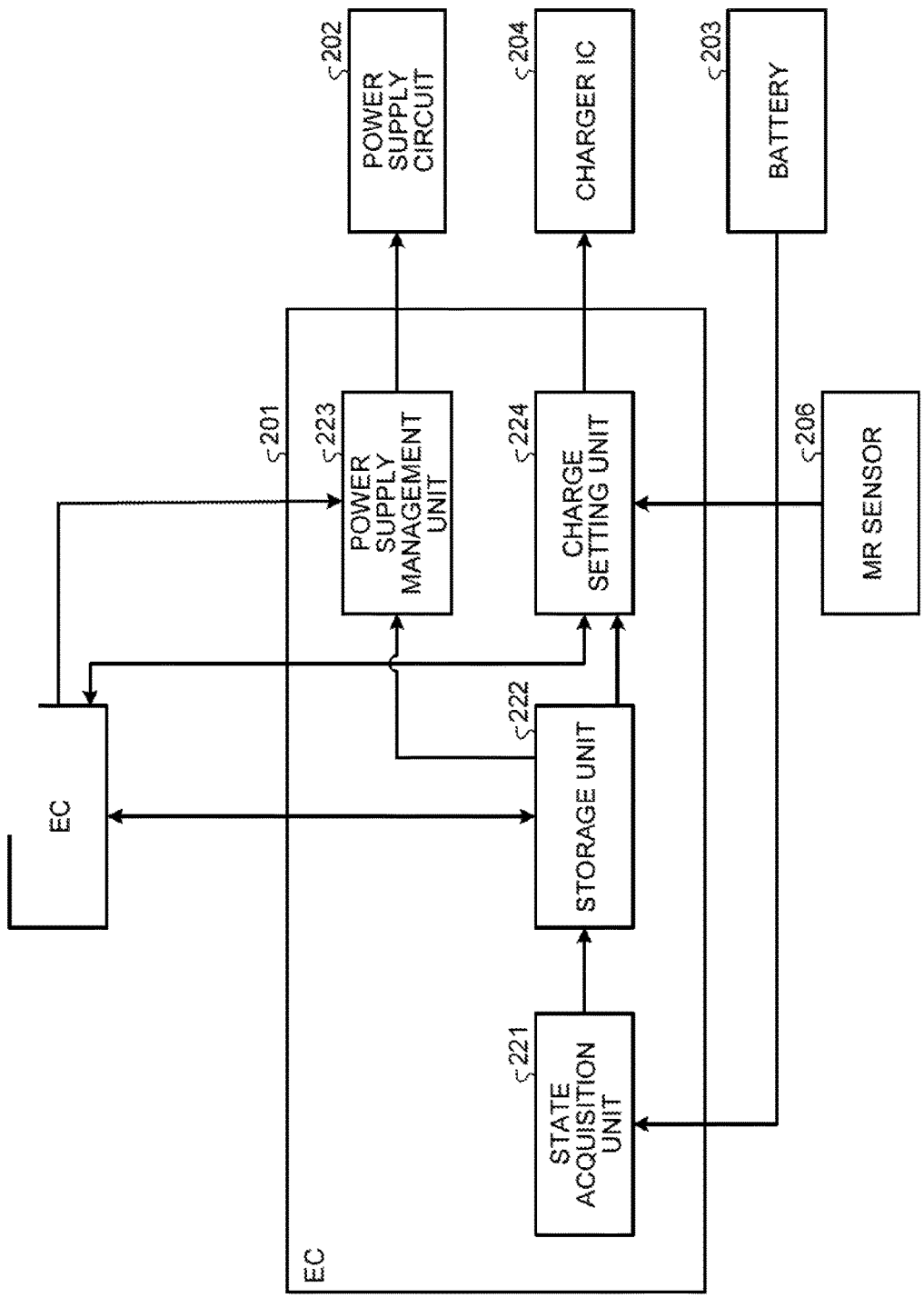

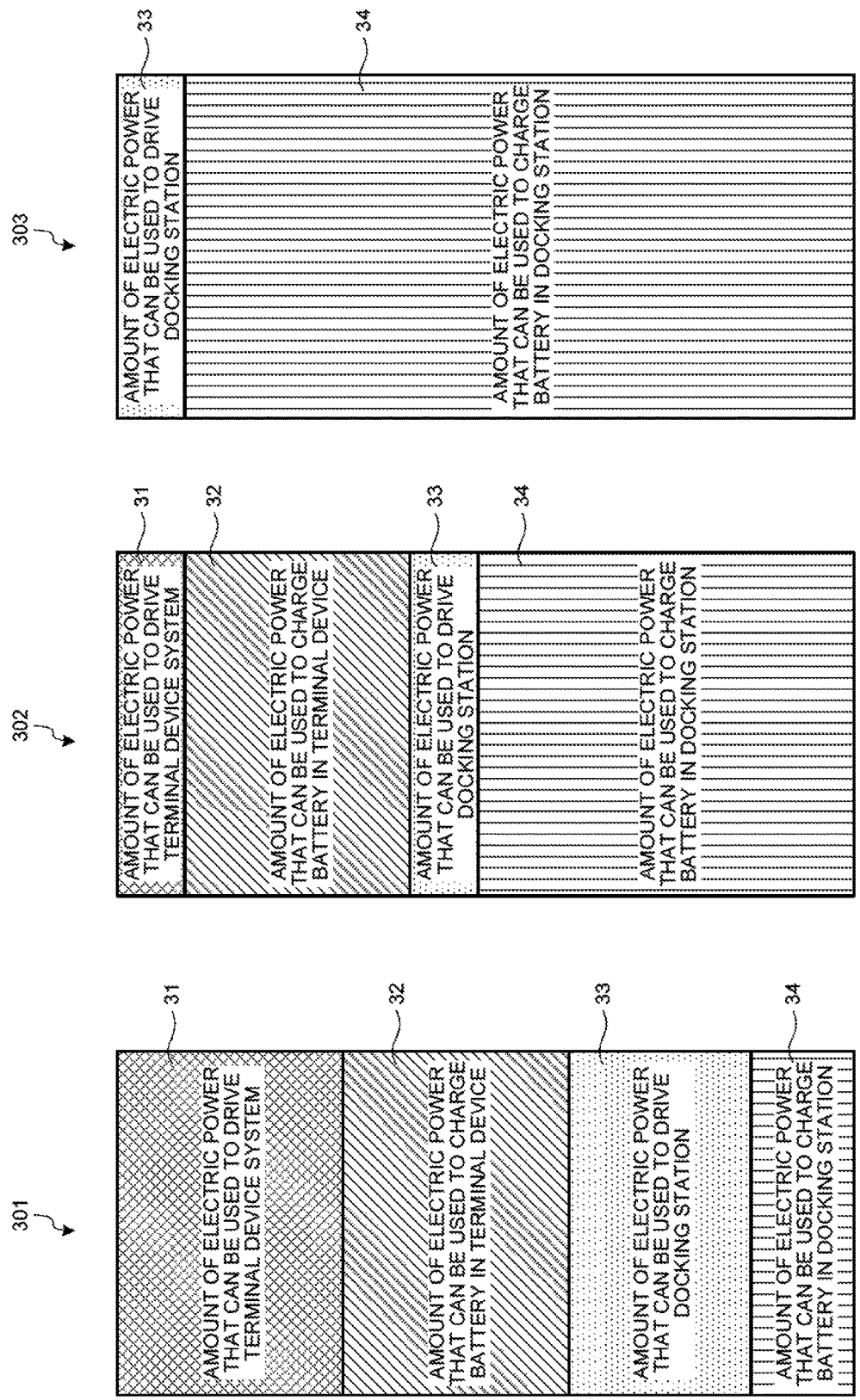

ELECTRONIC SYSTEM, TERMINAL DEVICE, AND FUNCTION EXPANSION DEVICE

CROSS-REFERENCE TO RELATED APPLICATION

This application is based upon and claims the benefit of priority of the prior Japanese Patent Application No. 2015-250119, filed on Dec. 22, 2015, the entire contents of which are incorporated herein by reference.

FIELD

The embodiment discussed herein is related to an electronic system, a terminal device, and a function expansion device.

BACKGROUND

Terminal devices, such as smart phones, tablet-type personal computers (PCs), or the like, that are widely used in recent years are mainly small and thin types because the terminal devices are assumed to be carried. Consequently, such a terminal device generally has a small number of external interfaces that are mounted on the device main body. Thus, if an external interface is additionally installed, the terminal device is generally used by connecting the terminal device to a function expansion device, such as a cradle, a docking station, or the like. In the following, a description will be given by using a docking station as an example of the function expansion device.

Furthermore, some docking stations have built-in batteries. By allowing an electric power supply to be supplied from the battery on the docking station side to a terminal device that is connected, even if an AC adapter is not used, it is possible to reduce consumption of the battery of the terminal device and thus it is possible to attempt to use the terminal device for a longer time.

In general, charging of a battery is performed by, using a dedicated charger integrated circuit (IC) and an embedded controller (EC) that controls the charger IC, collectively judging an electric power supply situation of the system, an amount of electric power consumption, the battery state, or the like. In a system in which a battery is mounted on both the terminal device and the docking station, a charger IC and an embedded controller are generally mounted on both the terminal device and the docking station. Furthermore, charging of each of the batteries is performed by the surplus electric power obtained by subtracting the electric power that is used for the operation of the system from an amount of the rated electric power of the AC adapter.

When each of the charger ICs of the batteries of the main body and the battery of the DS individually proceeds to perform the charging, by mutually grasping an electric power situation of the counterpart, the two batteries can efficiently be charged within an amount of the rated electric power of the AC adapter. In general, the AC adapter that is used for a tablet or the like has a small outer shape and an amount of rated electric power thereof is small by taking into consideration of portability. Consequently, if a priority is given to an electric power supply with respect to charging of a battery of a terminal device, the electric power that can be used to charge the battery of the docking station becomes very small. In this state, the time taken to complete the charging of the battery of the docking station may possibly become very long.

As a technology to efficiently allocate electric power in an amount of rated electric power of an AC adapter, there is a conventional technology that changes electric power of charging of each battery while monitoring the electric power consumed in an AC adapter connected to a docking station and giving a priority for surplus electric power to the charging of each battery of a terminal device.

Furthermore, as a technology that charges two batteries, there is a conventional technology that arranges a charging device, which includes therein a spare battery between an external power supply and an electronic device that includes therein a battery, and that controls the charging of each of the batteries in accordance with an electric power state of an electronic device.

Patent Document 1: Japanese Laid-open Patent Publication No. 2009-301281

Patent Document 2: Japanese Laid-open Patent Publication No. 08-251830

However, in a charging device that includes therein the spare battery, attaching/detaching of the terminal device with respect to an apparatus that includes therein a battery is not considered; therefore, it is difficult to efficiently charge both the batteries of the docking station and the terminal device that can be attached and detached.

Furthermore, the conventional technology that monitors electric power consumption of the AC adapter monitors the electric power consumption of the AC adapter connected to the docking station by performing communication between the embedded controller of the terminal device and the embedded controller of the docking station. Consequently, a problem occurs when a large amount of electric power received from the AC adapter that is performing the charging of the following battery is instantaneously consumed. For example, a problem occurs when, in a state in which a terminal device is connected to a docking station, a load applied to the terminal device or the docking station is sharply increased. Furthermore, a problem occurs when, if a battery of a docking station to which the terminal device is not connected is being charged by using a large amount of electric power, a terminal device that is in a high load state is connected. In such a situation, because a large amount of electric power is instantaneously consumed from the AC adapter, electric power that exceeds an amount of rated electric power of the AC adapter may possibly be output from the AC adapter, while electric power that is used to charge a battery due to communication between the embedded controllers is being decreased. Consequently, the AC adapter becomes deteriorated and a supply of power from the AC adapter may possibly stop. Furthermore, with the conventional technology that monitors the electric power consumption of the AC adapter, because the AC adapter is connected to the docking station, it is difficult to handle the state in which the AC adapter is connected to the terminal device.

SUMMARY

According to an aspect of an embodiment, an electronic system includes: a first electronic device; and a second electronic device that is connected to the first electronic device and that receives an electric power supply from the same power supply as that of the first electronic device, wherein the first electronic device includes a load that consumes electric power, a state notification unit that notifies, when an amount of electric power consumption of the first electronic device is small, the second electronic device of a small electric power consumption state, and a power-on management unit that notifies, in response to an instruction to turn on a power supply, the second electronic device that the power supply is turned on and that starts the electric power supply to the load, and the second electronic device includes an electric power control unit that decreases, when a notification of the small electric power consumption state is received from the state notification unit, electric power consumption of the second electronic device when a notification that the power supply is turned on is received from the power-on management unit and that increases, when a notification of the small electric power consumption state is received from the state notification unit, the electric power consumption of the second electronic device when the notification that the power supply is turned on is not received from the power-on management unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a schematic diagram illustrating the configuration of an electronic system according to an embodiment;

FIG. 4 is a schematic diagram illustrating electric power supply paths of the terminal device and the docking station;

FIG. 5 is a block diagram of an EC in the terminal device;

FIG. 6 is a schematic diagram illustrating ACPI statuses;

FIG. 7 is a block diagram illustrating an EC in the docking station;

FIG. 8 is a schematic diagram illustrating the limit of a charging current of a battery of the docking station according to the embodiment;

FIG. 14 is a flowchart illustrating the flow of a process performed when a power button of the terminal device is turned on.

DESCRIPTION OF EMBODIMENT

Preferred embodiments of the present invention will be explained with reference to accompanying drawings. The electronic system, the terminal device, the function expansion device, the power supply management device, and the power supply management program disclosed in the present invention are not limited to the embodiments below.

FIG. 1 is a schematic diagram illustrating the configuration of an electronic system according to an embodiment. As illustrated in FIG. 1, the electronic system according to the embodiment includes a terminal device 1 and a docking station 2. The terminal device 1 corresponds to an example of a "first electronic device". The docking station 2 corresponds to an example of a "second electronic device" and a "function expansion device".

The terminal device 1 and the docking station 2 can be connected. Furthermore, if the terminal device 1 is connected to the docking station 2, a state 3 is obtained. In a case of the state 3, the terminal device 1 can use the function of the docking station 2.

Figure 2:
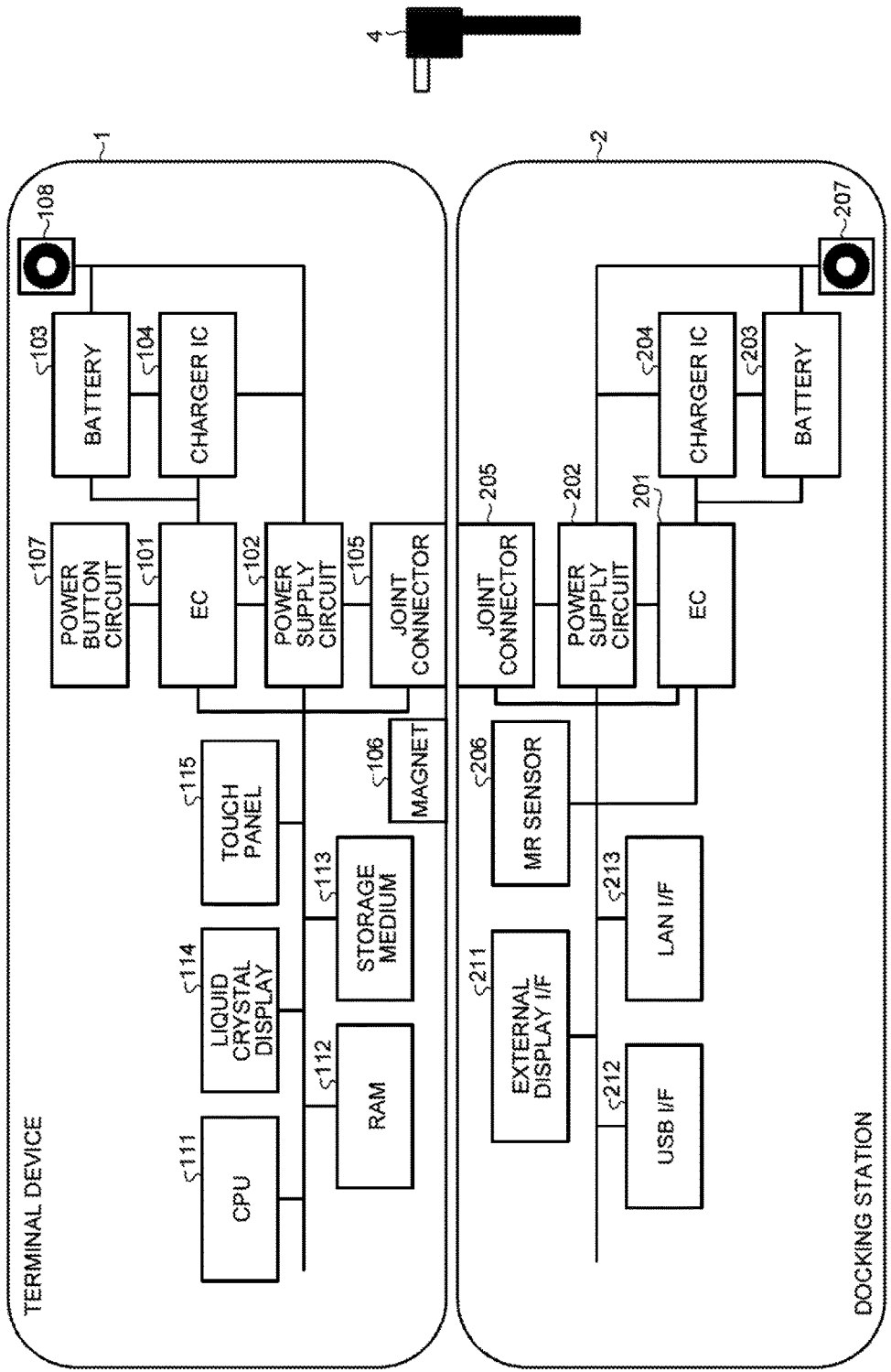
FIG. 2 is a schematic diagram illustrating the hardware configurations of a terminal device and a docking station.
Figure 3:
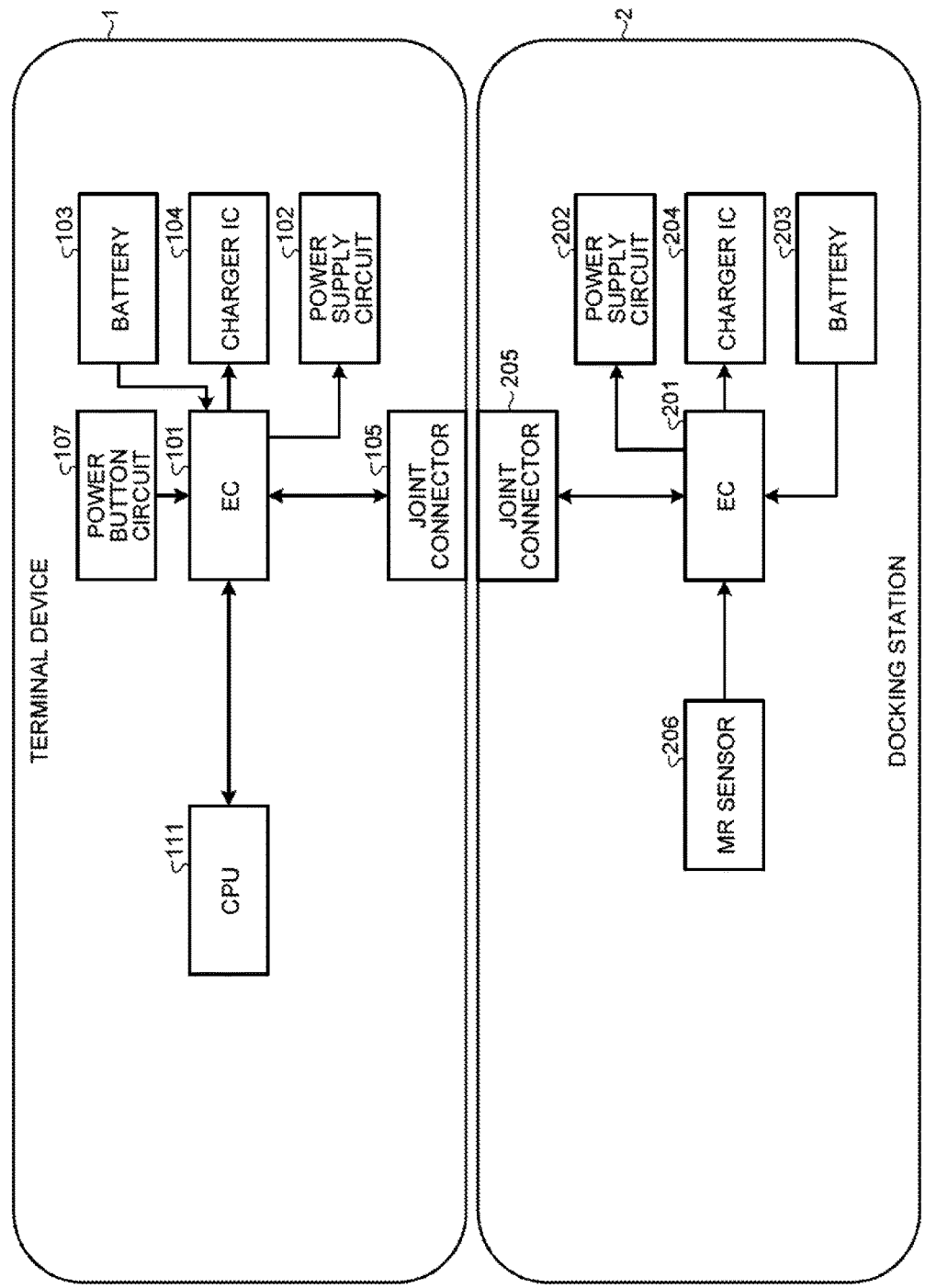
FIG. 3 is a schematic diagram illustrating transmission paths of a control signal of the terminal device and the docking station.

FIG. 2 is a schematic diagram illustrating the hardware configurations of a terminal device and a docking station. In FIG. 2, electric power supply paths and transmission paths of a control signal are illustrated in a mixed manner. FIG. 3 is a schematic diagram illustrating transmission paths of a control signal of the terminal device and the docking station. Furthermore, FIG. 4 is a schematic diagram illustrating electric power supply paths of the terminal device and the docking station. Namely, FIG. 3 is a diagram illustrating only the transmission paths of the control signal extracted from FIG. 2. Furthermore, FIG. 4 is a diagram illustrating only the electric power supply paths extracted from FIG. 2. The terminal device 1 and the docking station 2, to which an alternating current (AC) adapter is connected, receives an electric power supply.

The terminal device 1 includes an EC 101, a power supply circuit 102, a battery 103, a charger IC 104, a joint connector 105, a magnet 106, and a power button circuit 107. Furthermore, the terminal device 1 includes a central processing unit (CPU) 111, a random access memory (RAM) 112, a storage medium 113, a liquid crystal display 114, and a touch panel 115. Furthermore, a terminal device system 110 illustrated in FIG. 4 is a system for implementing various kinds of functions, such as arithmetic processing or the like, of the terminal device 1 including the CPU 111, the RAM 112, the storage medium 113, the liquid crystal display 114, and the touch panel 115. The terminal device system 110 may also include an output interface, such as a built-in display, or the like. Furthermore, the terminal device system 110 may also an output interface, such as a touch pad, a keyboard, or the like. Furthermore, the terminal device system 110 may also include other various kinds of devices.

As illustrated in FIG. 3, the EC 101 is connected to the power supply circuit 102, the battery 103, the charger IC 104, the power button circuit 107, and the CPU 111 by a bus. The EC 101 performs communication with the CPU 111 by using a general purpose input output (GPIO) signal. Furthermore, the EC 101 performs communication with the power button circuit 107 by using a GPIO signal. Furthermore, the EC 101 performs communication with the battery 103 and the charger IC 104 by using a serial signal. Furthermore, the EC 101 performs communication with the power supply circuit 102 by using the GPIO signal. Furthermore, if the terminal device 1 and the docking station 2 are connected, the EC 101 performs communication with an EC 201 via the joint connector 105 and a joint connector 205 of the docking station 2 by using serial communication. The serial communication is, for example, an inter-integrated circuit (I2C).

FIG. 5 is a block diagram of an EC in the terminal device. As illustrated in FIG. 5, the EC 101 includes a storage unit 121, a charge setting unit 122, a state acquisition unit 123, a power supply management unit 124, and a power-on management unit 125. In practice, the EC 101 and the EC 201 are connected via the joint connectors 105 and 205; however, in a description below, for convenience of explanation, a description will be given such that the EC 101 is directly connected to the EC 201. The EC 101 mentioned here corresponds to an example of a "power supply management device".

The power-on management unit 125 receives, from the power button circuit 107, a notification that a power button has been pressed. Here, in the embodiment, a description will be given of a case in which a power button has been pressed as an example in which a power supply is turned on; however, another method may also be used for the method of turning on the power supply. For example, as a method of turning on the power supply, a wake on local area network (WOL) may also be used.

If the power-on management unit 125 receives, from the power button circuit 107, a notification that a system power supply is turned on, the power-on management unit 125 checks, if the terminal device 1 and the docking station 2 are connected, the ACPI status of the terminal device 1 stored in the storage unit 121. If the ACPI status of the terminal device 1 is other than S0, the power-on management unit 125 notifies the EC 201 of the limit of a battery charging current.

Then, the power-on management unit 125 receives a limiting completion notification from the EC 201. When the power-on management unit 125 receives the limiting completion notification from the EC 201, the power-on management unit 125 notifies the CPU 111 that the power supply has been turned on.

The state acquisition unit 123 acquires the ACPI status from the CPU 111. The ACPI status mentioned here is information indicating an operation state of the system. Furthermore, the state acquisition unit 123 acquires, from the battery 103, the battery state indicating the state of the battery 103. Furthermore, the state acquisition unit 123 acquires AC connection information or the like that indicates the connection state of an AC adapter 4. Then, the state acquisition unit 123 stores, in the storage unit 121, status information including the ACPI status information, the AC connection information, the battery state, and the limit state of the charging current related to the terminal device 1. Furthermore, the state acquisition unit 123 allows the EC 201 to store the status information on the terminal device 1.

Furthermore, the state acquisition unit 123 periodically acquires, from the EC 201, the status information including the ACPI status information, the AC connection information, the battery state, and the limit state of the charging current related to the docking station 2. Then, the state acquisition unit 123 stores, in the storage unit 121, the status information on the docking station 2.

Here, the terminal device 1 and the docking station 2 according to the embodiment includes, as the ACPI statuses, each of the statuses illustrated in FIG. 6. FIG. 6 is a schematic diagram illustrating the ACPI statuses. In FIG. 6, the ACPI status is illustrated by using the state of the terminal device 1 as an example.

The S0 is the state when the terminal device 1 is operated and is the state in which all of the power supplies used to operate the terminal device 1 are turned on. The terminal device 1 that is in the status other than the S0 shifts to S0 when the terminal device 1 operates the CPU 111 or the like.

The symbol represented by S3 is a sleep state, the state of the terminal device 1 is stored in a main storage device (the RAM 112), and a power supply is supplied to the main storage device. The terminal device 1 that is in the state of S3 can return to the state of S0 in a shortest time from among the states other than S0.

The symbol represented by S4 is an idle state, the state of the terminal device 1 is stored in an auxiliary storage device (the storage medium 113), and power supply is supplied to the auxiliary storage device or the like. The terminal device 1 that is in the state of S4 can return to the state of S0 in a time less than that in the state of S5 or S6, though longer than that in the state of S3.

The symbol represented by S5 is a shutdown state and is a state in which power supplies of almost all the devices except for some device (a LAN, etc.) that is a system return factor and a device (the EC 101, etc.) that always uses a power supply are turned off. The symbol represented by G3 is a shutdown state and is a state in which power supplies of almost all the devices except for a device (the EC 101, etc.) that always uses a power supply are turned off. The terminal device 1 that is in the state of G3 needs the longest time to return to the state of S0 from among the states other than S0. The terminal device 1 that is in the state of S5 also needs substantially the same time as that needed by the terminal device 1 in the state of G3 to return to the state of S0.

Interchanging the status information is specifically performed as follows. The state acquisition unit 123 monitors the status of the terminal device 1 and, if the status is changed, the state acquisition unit 123 rewrites the status information on the terminal device 1 stored in the storage unit 121 to a new status. Furthermore, the state acquisition unit 123 rewrites the status information on the terminal device 1 held by the EC 201 in the docking station 2 to a new status. Furthermore, the state acquisition unit 123 periodically sends, to the EC 201, a read request for the status information on the docking station 2. Then, the state acquisition unit 123 acquires the status information on the docking station 2 sent from the EC 201 and rewrites the status information on the docking station 2 stored in the memory included in the own EC 101 to the acquired status.

The state acquisition unit 123 mentioned here corresponds to an example of a "state notification unit". Furthermore, the process, performed by the state acquisition unit 123, of allowing the EC 201 in the docking station 2 to hold the statuses other than S0 as the ACPI statuses of the terminal device 1 corresponds to an example of a "notification of small electric power consumption state".

The power supply management unit 124 determines, by using the status information on both the terminal device 1 and the docking station 2, the direction of an electric power supply and a power supply that performs the electric power supply. Then, the power supply management unit 124 controls the power supply circuit 102 such that the power supply is supplied to each of the units by using the determined direction of the electric power supply and the power supply that performs the electric power supply.

Furthermore, the charge setting unit 122 decides the setting of the charging of the battery 103 by using the status information on both the terminal device 1 and the docking station 2. Then, the charge setting unit 122 notifies the power supply circuit 102 of the setting of the charging of a battery 203.

Furthermore, as illustrated in FIG. 4, the EC 101 is connected to the power supply circuit 102 by the electric power supply path. Then, the EC 101 receives an electric power supply from the power supply circuit 102. The EC 101 is driven by using the electric power supplied from the power supply circuit 102.

The power supply circuit 102 receives control in accordance with the direction of the electric power supply and the power supply that performs the electric power supply that are determined by the EC 101. Then, by using the electric power supplied from the determined power supply, the power supply circuit 102 creates a power supply type that is used by each of the devices mounted on the terminal device 1. Furthermore, if the direction of the electric power supply is the direction indicating from the terminal device 1 toward the docking station 2, the power supply circuit 102 creates, by using the electric power supplied from the power supply, a power supply type that is supplied to the docking station 2.

The power supply circuit 102 is connected to, as illustrated in FIG. 4, the EC 101, the battery 103, the charger IC 104, the joint connector 105, an AC connector 108, and the terminal device system 110 by the electric power supply paths. If the AC adapter 4 is connected to the AC connector 108 and a power supply is the AC adapter 4, the power supply circuit 102 receives an electric power supply from the AC adapter 4. Furthermore, if a power supply is the battery 103, the power supply circuit 102 receives a supply of the electric power from the battery 103. Furthermore, if an electric power supply is received from the docking station 2, the power supply circuit 102 receives a supply of the electric power from a power supply circuit 202 via the joint connector 105 and the joint connector 205 in the docking station 2.

The power supply circuit 102 supplies the power supply type created by using the electric power supplied from the power supply to, for example, the EC 101, the charger IC 104, and the terminal device system 110. Furthermore, when performing an electric power supply to the docking station 2, the power supply circuit 102 supplies the created power supply type to the power supply circuit 202 via the joint connector 105 and the joint connector 205 in the docking station 2.

The charging of the battery 103 is performed by the charger IC 104 using the electric power sent from the power supply circuit 102. Furthermore, the battery 103 supplies, when serving as a power supply, the electric power to the power supply circuit 102.

The charger IC 104 receives, from the EC 101, a notification of the setting indicating that the charging is to be performed. Then, the charger IC 104 charges the battery 103 in accordance with the notified setting.

The power button circuit 107 includes a power button (not illustrated). Then, if the power button is pressed, the power button circuit 107 notifies the EC 101 that the power button has been pressed.

The terminal device system 110 that includes the CPU 111 receives an electric power supply from the power supply circuit 102. The CPU 111 receives a notification of the on state of the power supply from the EC 101. Then, by using the power supply supplied from the power supply circuit 102, the CPU 111 starts to drive, for example, the RAM 112, the storage medium 113, the liquid crystal display 114, and the touch panel 115 and allows the terminal device system 110 to be in the on state of the power supply. The terminal device system 110 mentioned here corresponds to an example of a "load" and an "arithmetic processing unit".

The docking station 2 includes, as illustrated in FIG. 2, the EC 201, the power supply circuit 202, the battery 203, a charger IC 204, the joint connector 205, an MR sensor 206, and an AC connector 207. Furthermore, the docking station 2 includes an external display interface (I/F) 211, a USB I/F 212, and a LAN I/F 213. Furthermore, a docking station system 210 illustrated in FIG. 4 is a system used to implement various kinds of functions of the docking station 2 that includes the external display I/F 211, the USB I/F 212, and the LAN I/F 213. The docking station system 210 may also include an output interface other than the external display I/F 211. Furthermore, the docking station system 210 may also include an input interface, such as a touch pad, a keyboard, or the like. Furthermore, the docking station system 210 may also include other various kinds of devices.

The EC 201 is connected to, as illustrated in FIG. 3, the power supply circuit 202, the battery 203, the charger IC 204, the joint connector 205, and the magneto resistance (MR) sensor 206 via a bus. The EC 201 performs communication with the battery 203 and the charger IC 204 by using the serial signal. Furthermore, the EC 201 controls the power supply circuit 202 by using a GPIO signal. Furthermore, the EC 201 identifies the detection state of the MR sensor 206 by using the GPIO signal. Furthermore, if the terminal device 1 and the docking station 2 are connected, the EC 201 performs communication with the EC 101 via the joint connector 205 and the joint connector 105 in the terminal device 1 by using serial communication.

FIG. 7 is a block diagram illustrating an EC in the docking station. As illustrated in FIG. 7, the EC 201 includes a state acquisition unit 221, a storage unit 222, a power supply management unit 223, and a charge setting unit 224.

The state acquisition unit 221 acquires the state of the battery 203 from the battery 203. Furthermore, the state acquisition unit 221 monitors the status of the docking station 2 including, for example, the connection state or the like of the AC adapter 4 with respect to the AC connector 207. Then, if the status of the docking station 2 has been changed, the state acquisition unit 221 updates the status information on the docking station 2 held in the storage unit 222 to the changed status.

If the terminal device 1 and the docking station 2 are in the connection state, the storage unit 222 periodically receives a read request for the status information from the EC 101. Then, the storage unit 222 outputs, to the EC 101 as a response to the read request for the status information, the status information on the docking station 2 held in the memory that is included in the own EC 201. Furthermore, if the status of the terminal device 1 has been changed, the status information on the terminal device 1 is written into the storage unit 222 by the EC 101.

The power supply management unit 223 receives, from the EC 101 in the terminal device 1, the information on the direction of the electric power supply and the power supply that performs the electric power supply. Then, the power supply management unit 223 controls the power supply circuit 202 in accordance with the received information on the direction of the electric power supply and the power supply that performs the electric power supply.

If the magnet 106 is detected by the MR sensor 206 when the terminal device 1 approaches in order to connect to the docking station 2, the charge setting unit 224 receives a detection notification of the magnet 106 from the MR sensor 206. In contrast, when the connected terminal device 1 and the docking station 2 are separated, if the MR sensor 206 no longer detects the magnet 106, the charge setting unit 224 receives, from the MR sensor 206, a notification that the magnet 106 is not detected.

Furthermore, if the power supply of the terminal device 1 is turned on in the state in which the ACPI status of the terminal device 1 is other than S0, the charge setting unit 224 receives, from the EC 101, a notification of the limit of the battery charging current. Furthermore, in response to the notification of the state from the battery 203, the charge setting unit 224 monitors the state of the battery 203.

Then, the charge setting unit 224 decides the setting of the charging of the battery 203 on the basis of the connection state, the ACPI status of the terminal device 1, the state of the battery 203, the detection state of the MR sensor 206, and the presence or absence of a notification of the limit of the battery charging current from the EC 101. Thereafter, the charge setting unit 224 notifies the charger IC 204 of the decided setting of the charging of the battery 203.

Specifically, if the terminal device 1 and the docking station 2 are not in the connection state, the charge setting unit 224 does not limit the charging current of the battery 203. Namely, the charge setting unit 224 notifies the charger IC 204 that the charging current of the battery 203 is not limited. The charge setting unit 224 mentioned here corresponds to an example of an "electric power control unit".

Furthermore, if the detection state of the magnet 106 obtained by the MR sensor 206 has been changed from non-detection to detection, the charge setting unit 224 decides to set the limit of the charging current of the battery 203 to the maximum. Then, the charge setting unit 224 notifies the charger IC 204 that the limit of the charging current of the battery 203 is set to the maximum. Consequently, when the unconnected terminal device 1 approaches the docking station 2, the charge setting unit 224 can set the limit of the charging current of the battery 203 to the maximum. Furthermore, because the limit of the charging current of the battery 203 is set to the maximum, even if, for example, the load of the mobile terminal device 1 at the connection timing is the maximum, the amount of electric power that is used after the connection can be suppressed to a value that does not exceed the amount of rated electric power of the AC adapter 4. The MR sensor 206 mentioned here corresponds to an example of a "detecting unit".

Furthermore, if the terminal device 1 and the docking station 2 are in the connection state and the ACPI status of the terminal device 1 is S0, the charge setting unit 224 decides to set the limit of the charging current of the battery 203 to the maximum. Then, the charge setting unit 224 notifies the charger IC 204 that the limit of the charging current of the battery 203 is set to the maximum.

Furthermore, if the terminal device 1 and the docking station 2 are in the connection state and the ACPI status of the terminal device 1 is other than S0, the charge setting unit 224 performs the following control. Namely, if the charge setting unit 224 does not receive a notification of the limit of the battery charging current, the charge setting unit 224 decides to set the limit of the charging current of the battery 203 to the value determined by considering the maximum charging of the battery 103 in the terminal device 1. More specifically, the charge setting unit 224 limits the charging current of the battery 203 such that the amount of electric power is within an amount of electric power obtained by subtracting the minimum electric power that is used by the system in the ACPI status of the terminal device 1 and the electric power of the maximum charging of the battery 103 from the amount of rated electric power of the AC adapter 4. Hereinafter, performing the limit mentioned here is referred to as "setting the limit of the charging current of the battery 203 to the minimum". Furthermore, the charge setting unit 224 notifies the charger IC 204 that the limit of the charging current of the battery 203 is set to the minimum.

In contrast, when receiving the notification of the battery charging current, the charge setting unit 224 sets the limit of the charging current of the battery 203 to the maximum. Then, the charge setting unit 224 notifies the charger IC 204 that the limit of the charging current of the battery 203 is set to the maximum. Thereafter, the charge setting unit 224 notifies the EC 101 of the completion of the maximum limit. Consequently, the limit of the charging current of the battery 203 becomes the maximum immediately before the status of the terminal device 1 is changed from the status other than S0 to S0 due to the power supply being turned on. Furthermore, because the limit of the charging current of the battery 203 is set to the maximum, even if the load of the terminal device 1 is sharply increased due to, for example, the power supply being turned on, the amount of electric power that is used after the power supply is turned on can be suppressed to a value that does not exceed the amount of rated electric power of the AC adapter 4.

In the following, the limit of the charging current of the battery 203 will be collectively described again with reference to FIG. 8. FIG. 8 is a schematic diagram illustrating the limit of the charging current of the battery of the docking station according to the embodiment. States 301 to 303 each indicate a breakdown of the amount of electric power that can be used for each purpose within the amount of rated electric power of the AC adapter 4.

If the MR sensor 206 detects the magnet 106, the limit of the charging current of the battery 203 is set to the maximum and the allocation of the amount of electric power becomes the state 301. Furthermore, in also a case in which the ACPI status of the terminal device 1 is S0, the limit of the charging current of the battery 203 is set to the maximum and the allocation of the amount of electric power becomes the state 301. Similarly, in also a case in which the ACPI status of the terminal device 1 is other than S0 and a notification of the limit of the battery charging current is received, the limit of the charging current of the battery 203 is set to the maximum and the allocation of the amount of electric power becomes the state 301.

Here, in each of the states 301 to 303, an amount of electric power 31 that can be used by driving the terminal device system 110, an amount of electric power 32 that can be used by charging the battery 103 in the terminal device 1, and an amount of electric power 33 that can be used by driving the docking station system 210 are previously set. In a description below, the amounts described above are simply referred to as the "amount of electric power 31", the "amount of electric power 32", and the "amount of electric power 33". If the limit of the charging current of the battery 203 is set to the maximum, as illustrated in the state 301, an amount of electric power 34 that can be used to charge the battery 203 in the docking station 2 is limited to the value obtained by subtracting the amount of electric power 31, the amount of electric power 32, and the amount of electric power 33 from the amount of rated electric power of the AC adapter 4.

Furthermore, if the ACPI status of the terminal device 1 is other than S0 and the notification of the limit of the battery charging current is not received, the limit of the charging current of the battery 203 is set to the minimum and the allocation of the amount of electric power becomes the state 302. In this case, because the ACPI status of the terminal device 1 is other than S0, the amount of electric power that can be used to drive the terminal device system 110 is suppressed in accordance with the subject ACPI status. Furthermore, because the ACPI status of the docking station 2 is also other than S0, the amount of electric power that can be used to drive the docking station system 210 can be decreased to low in accordance with the ACPI status. Thus, if the limit of the charging current of the battery 203 is set to the minimum, as indicated by the state 302, the amount of electric power 34 that can be used to charge the battery 203 in the docking station 2 is limited to the value obtained by subtracting the amount of electric power 31 decreased to low, the amount of electric power 32, and the amount of electric power 33 that is decreased to low from the amount of rated electric power of the AC adapter 4. The amount of electric power 34 that can be used to charge the battery 203 in the docking station 2 in the state 302 is greater than the state 301.

Furthermore, if the terminal device 1 is not connected to the docking station 2, the charging current of the battery 203 is not limited and the allocation of the amount of electric power becomes the state 303. In this case, because an electric power supply is not performed on the terminal device 1, the amounts of electric power 31 and 32 can be ignored. Thus, if no limit of the charging current of the battery 203 is set, as indicated by the state 303, the amount of electric power 34 that can be used to charge the battery 203 in the docking station 2 is up to the value obtained by subtracting only the amount of electric power 33 that is decreased to low from the amount of rated electric power of the AC adapter 4. The amount of electric power 34 that can be used to charge the battery 203 of the docking station 2 that is in the state 303 is significantly greater than that in the states 301 and 302.

In this way, by increasing, in accordance with each of the states of the terminal device 1 and the docking station 2, the amount of electric power that can be used to charge the battery 203 in the docking station 2, it is possible to reduce the charging time of the battery 203.

The EC 201 is connected to, as illustrated in FIG. 4, the power supply circuit 202 by the electric power supply path. Then, the EC 201 receives the electric power supply from the power supply circuit 202. The EC 201 is driven by using the electric power supplied from the power supply circuit 202.

The power supply circuit 202 receives control from the EC 201 in accordance with the direction of the electric power supply and the power supply that performs the electric power supply that are decided by the EC 101. Then, by using the electric power supplied from the decided power supply, the power supply circuit 202 creates a power supply type used by each of the devices mounted on the docking station 2. Furthermore, if the direction of the electric power supply is the direction from the docking station 2 toward the terminal device 1, the power supply circuit 202 creates, by using the electric power supplied from the power supply, a power supply type that is supplied to the terminal device 1.

The power supply circuit 202 is connected to, as illustrated in FIG. 4, the EC 201, the battery 203, the charger IC 204, the joint connector 205, the MR sensor 206, the AC connector 207, and the docking station system 210 by the electric power supply paths. If the AC adapter 4 is connected to the AC connector 207 and the power supply is the AC adapter 4, the power supply circuit 202 receives an electric power supply from the AC adapter 4. Furthermore, if the power supply is the battery 203, the power supply circuit 202 receives a supply of the electric power from the battery 103. Furthermore, if an electric power supply is received from the terminal device 1, the power supply circuit 202 receives a supply of the electric power from the power supply circuit 102 via the joint connector 205 and the joint connector 105 in the terminal device 1.

The power supply circuit 202 supplies the power supply type created by using the electric power that is supplied from the power supply to, for example, the EC 201, the charger IC 204, and the docking station system 210. Furthermore, if an electric power supply is performed on the terminal device 1, the power supply circuit 202 supplies the created power supply type to the power supply circuit 102 via the joint connector 205 and the joint connector 105 in the terminal device 1.

The charging of the battery 203 is performed by the charger IC 204 by using the electric power sent from the power supply circuit 202. Furthermore, the battery 203 supplies, when serving as a power supply, the electric power to the power supply circuit 202.

The charger IC 204 receives, from the EC 201, a notification of setting indicating that the charging is to be performed. Then, the charger IC 204 charges the battery 203 in accordance with the notified setting.

The docking station system 210 receives an electric power supply from the power supply circuit 202. Then, each of the units in the docking station system 210 including the external display I/F 211, the USB I/F 212, and the LAN I/F 213 are driven by using the electric power supplied from the power supply circuit 202.

Figure 9:
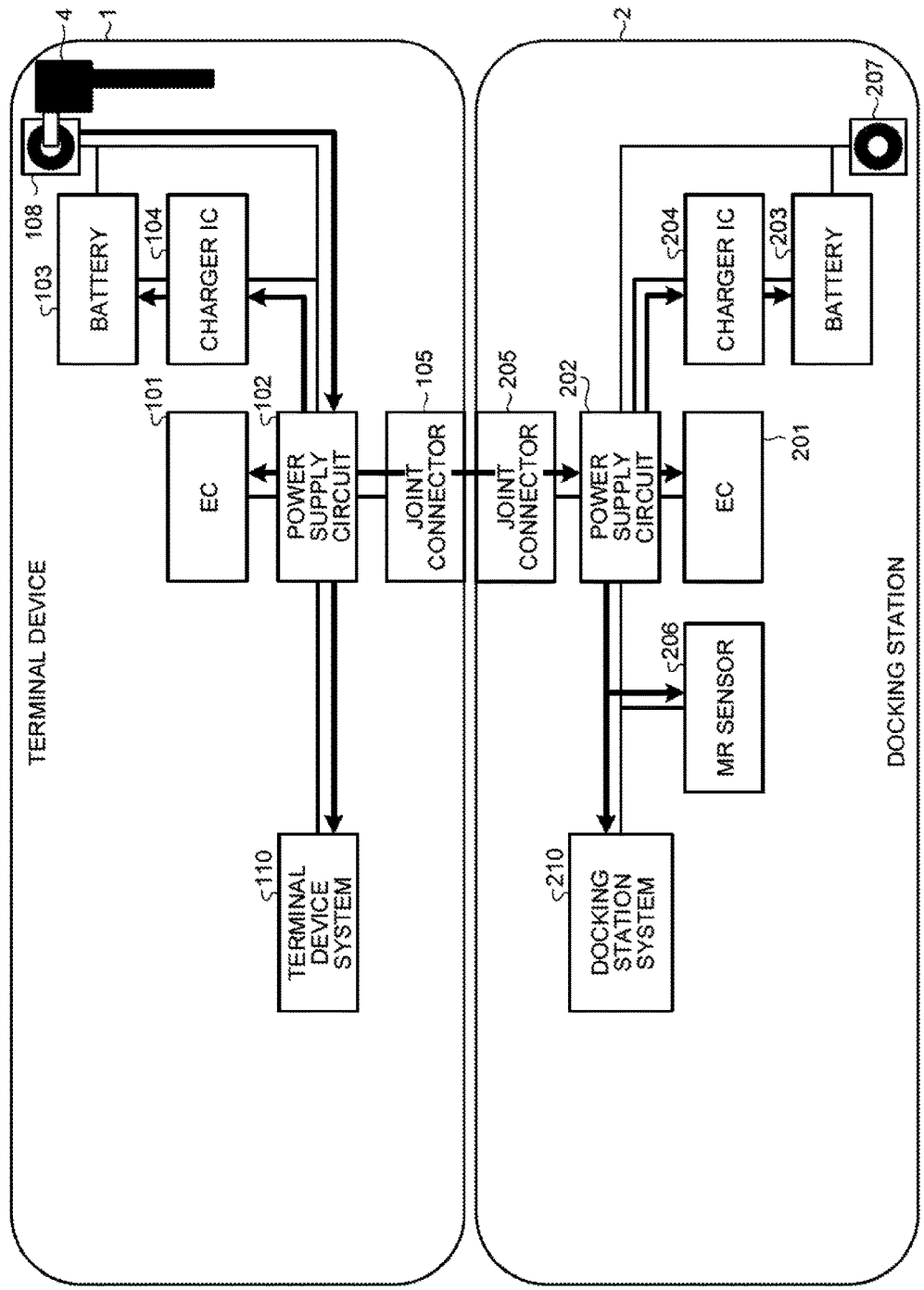
FIG. 9 is a schematic diagram illustrating the flow of an electric power supply when the AC adapter is connected to the terminal device.
Figure 10:
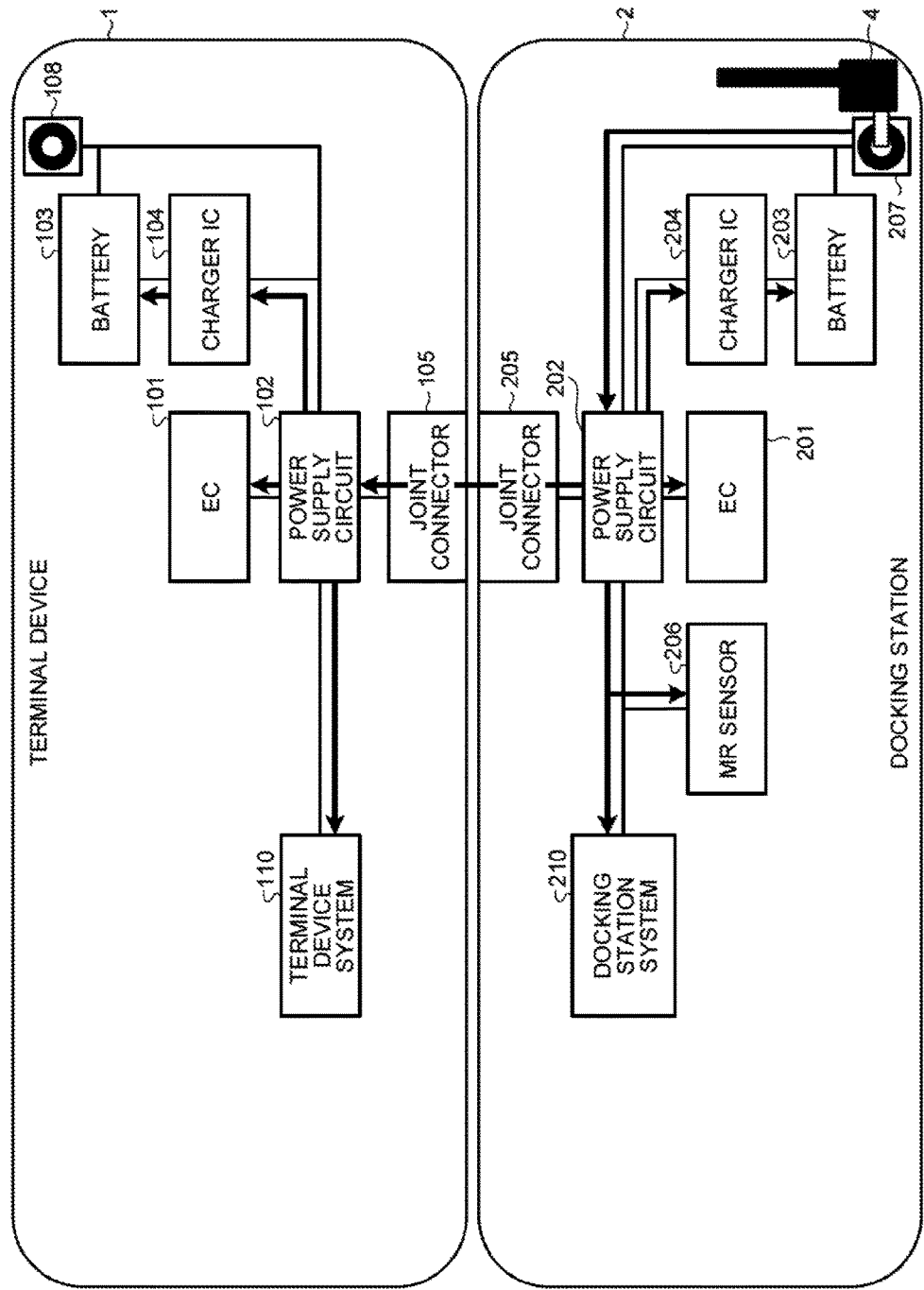
FIG. 10 is a schematic diagram illustrating the flow of an electric power supply when the AC adapter is connected to the docking station.
Figure 11:
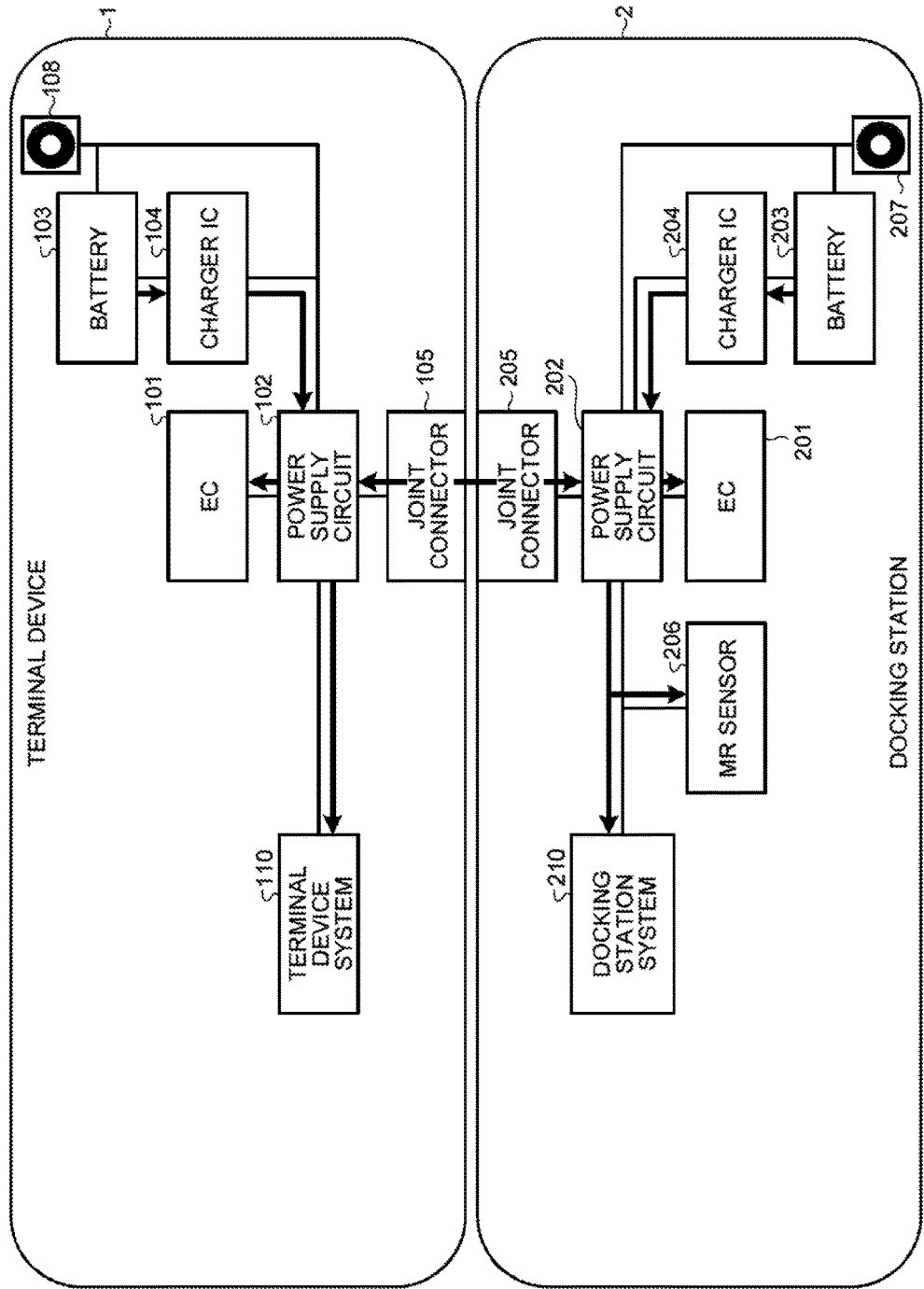
FIG. 11 is a schematic diagram illustrating the flow of an electric power supply when the AC adapter is not connected.

In the following, the flow of the electric power supply associated with the connection state of the AC adapter 4 will collectively described with reference to FIGS. 9 to 11. FIG. 9 is a schematic diagram illustrating the flow of an electric power supply when the AC adapter is connected to the terminal device. FIG. 10 is a schematic diagram illustrating the flow of an electric power supply when the AC adapter is connected to the docking station. FIG. 11 is a schematic diagram illustrating the flow of an electric power supply when the AC adapter is not connected. Furthermore, FIGS. 9 to 11 each illustrate the state in which the terminal device 1 and the docking station 2 are connected.

If the AC adapter 4 is connected to the AC connector 108 in the terminal device 1 and the AC adapter 4 is not connected to the docking station 2, as illustrated in FIG. 9, an electric power supply is performed. The electric power that is output by the AC adapter 4 connected to the AC connector 108 is supplied to the power supply circuit 102. The power supply circuit 102 creates a power supply type by using the supplied electric power. Then, the power supply circuit 102 supplies the electric power to the EC 101, the charger IC 104, and the terminal device system 110. The charger IC 104 charges the battery 103 by using the electric power that is input to the power supply circuit 102. Furthermore, in the state illustrated in FIG. 9, a power supply is supplied from the terminal device 1 to the docking station 2. Namely, the power supply circuit 102 supplies the electric power to the power supply circuit 202 via the joint connectors 105 and 205. The power supply circuit 202 receives a supply of the electric power from the power supply circuit 102. Then, the power supply circuit 202 creates a power supply type by using the supplied electric power. Then, the power supply circuit 202 supplies the electric power to the EC 201, the charger IC 204, the MR sensor 206, and the docking station system 210. The charger IC 204 charges the battery 203 by using the electric power that is input from the EC 201.

If the AC adapter 4 is connected to the AC connector 207 in the docking station 2 and the AC adapter 4 is not connected to the terminal device 1, as illustrated in FIG. 10, an electric power supply is performed. The electric power that is output by the AC adapter 4 connected to the AC connector 207 is supplied to the power supply circuit 202. The power supply circuit 202 creates a power supply type by using the supplied electric power. Then, the power supply circuit 202 supplies the electric power to the EC 201, the charger IC 204, the MR sensor 206, and the docking station system 210. The charger IC 204 charges the battery 203 by using the electric power that is input from the power supply circuit 202. Furthermore, in the state illustrated in FIG. 10, a power supply is supplied from the docking station 2 to the terminal device 1. Namely, the power supply circuit 202 supplies the electric power to the power supply circuit 102 via the joint connectors 205 and 105. The power supply circuit 102 receives a supply of the electric power from the power supply circuit 202. Then, the power supply circuit 102 creates a power supply type by using the supplied electric power. Then, the power supply circuit 102 supplies the electric power to the EC 101, the charger IC 104, and the terminal device system 110. The charger IC 104 charges the battery 103 by using the electric power that is input from the EC 101.

In also both the cases illustrated in FIGS. 9 and 10, both the batteries 103 and 203 are charged. Then, in these cases, the limit of the charging current of the battery 203 described above is performed at the time of the charging of the battery 203.

If the AC adapter 4 is not connected to both the terminal device 1 and the docking station 2, an electric power supply is performed as illustrated in FIG. 11. The battery 103 performs an electric power supply to the power supply circuit 102 via the charger IC 104. Furthermore, the battery 203 performs an electric power supply to the power supply circuit 202 via the charger IC 204. Here, in the embodiment, the battery 103 supplies the electric power to the power supply circuit 102 via the charger IC 104; however, an electric power supply may also directly be performed to the power supply circuit 102 without passing through the charger IC 104. This also applies to the docking station 2. Furthermore, in this case, an electric power supply is performed between the power supply circuit 102 and the power supply circuit 202 from a high voltage to a low voltage.

If the electric power supply is performed from the power supply circuit 102 to the power supply circuit 202, the power supply circuit 102 creates a power supply type by using the electric power supplied from the battery 103. Then, the power supply circuit 102 supplies the electric power to the EC 101, the charger IC 104, and the terminal device system 110. Furthermore, the power supply circuit 202 receives the supply of the electric power from the power supply circuit 102. Then, the power supply circuit 202 creates a power supply type by using the supplied electric power. Then, the power supply circuit 202 supplies the electric power to the EC 201, the charger IC 204, the MR sensor 206, and the docking station system 210.

Furthermore, if an electric power supply is performed from the power supply circuit 202 to the power supply circuit 102, the power supply circuit 202 creates a power supply type by using the electric power supplied from the battery 203. Then, the power supply circuit 202 supplies the electric power to the EC 201, the charger IC 204, the MR sensor 206, and the docking station system 210. Furthermore, the power supply circuit 102 receives a supply of the electric power from the power supply circuit 202. Then, the power supply circuit 102 creates a power supply type by using the supplied electric power. Then, the power supply circuit 102 supplies the electric power to the EC 101, the charger IC 104, and the terminal device system 110.

Here, in the case illustrated in FIG. 11, because the charging of the battery 203 is not performed, the limit of the charging current of the battery 203 is not performed.

Figure 12:
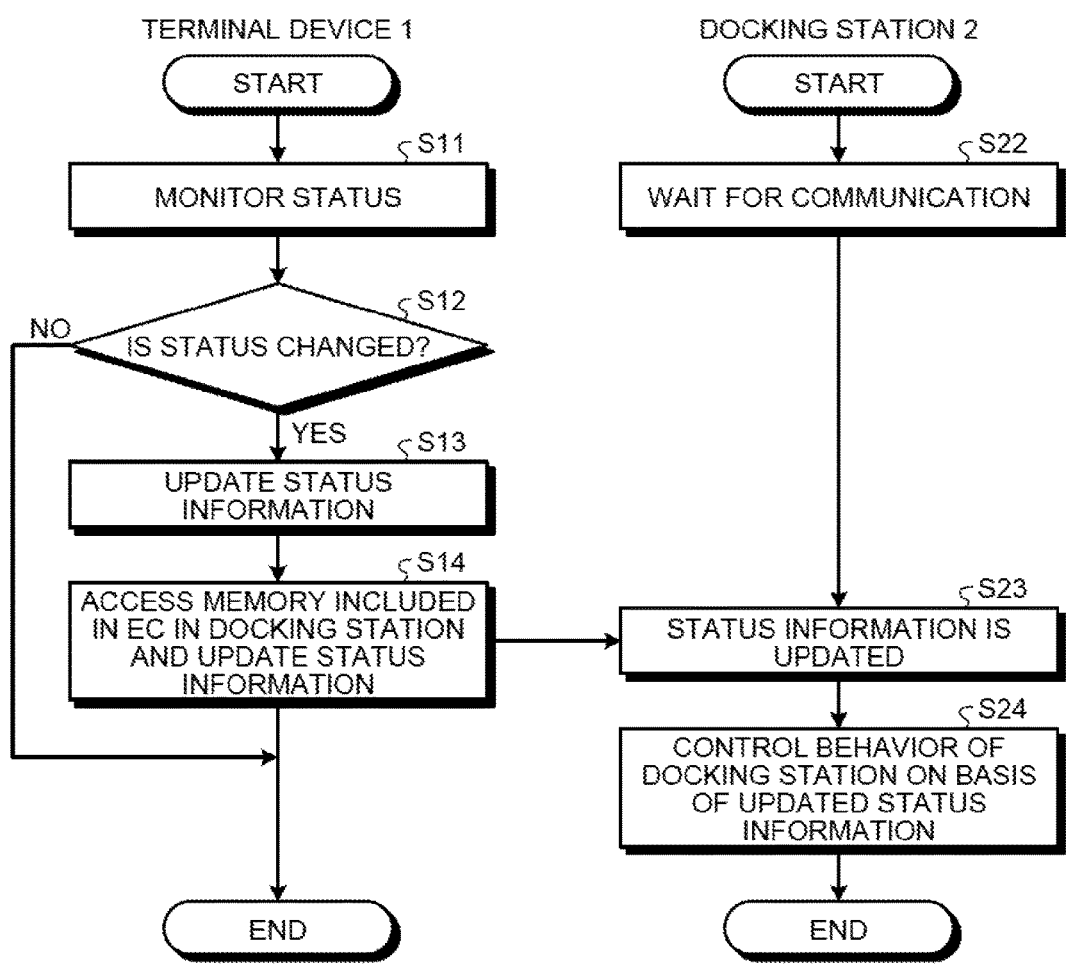
FIG. 12 is a flowchart illustrating the flow of an update process performed on status information on the terminal device.

In the following, the flow of an update process of the status information on the terminal device according to the embodiment will be described with reference to FIG. 12. FIG. 12 is a flowchart illustrating the flow of an update process performed on status information on the terminal device.

The state acquisition unit 123 in the EC 101 in the terminal device 1 monitors the status of the terminal device 1 including the connection state of the AC adapter 4, the ACPI status, or the like (Step S11).

Then, the state acquisition unit 123 determines whether the status of the terminal device 1 has been changed (Step S12). If the status is not changed (No at Step S12), the state acquisition unit 123 ends the update process of the status information on the terminal device 1.

In contrast, if the status has been changed (Yes at Step S12), the state acquisition unit 123 changes and updates the status information on the terminal device 1 stored in the storage unit 121 to a new status (Step S13).

Then, the state acquisition unit 123 accesses the storage unit 222 in the EC 201 in the docking station 2 and then changes and updates the status information on the terminal device 1 stored in the storage unit 222 to a new status (Step S14).

In contrast, in the docking station 2, the storage unit 222 waits for communication from the EC 101 in the terminal device 1 (Step S22).

Here, the arrow extended from Step S14 to Step S23 illustrated in FIG. 12 indicates that the process at Step S23 is performed in the docking station 2 by causing the terminal device 1 to perform the process at Step S14. Namely, the status information stored in the storage unit 222 by itself is updated by the EC 101 (Step S23).

Then, the charge setting unit 224 and the power supply management unit 223 control the behavior of the docking station 2 on the basis of the updated status information on the terminal device 1 (Step S24). This process includes, on the basis of the ACPI status of the terminal device 1, control in which the charge setting unit 224 performs control of the charging current of the battery 203.

Figure 13:
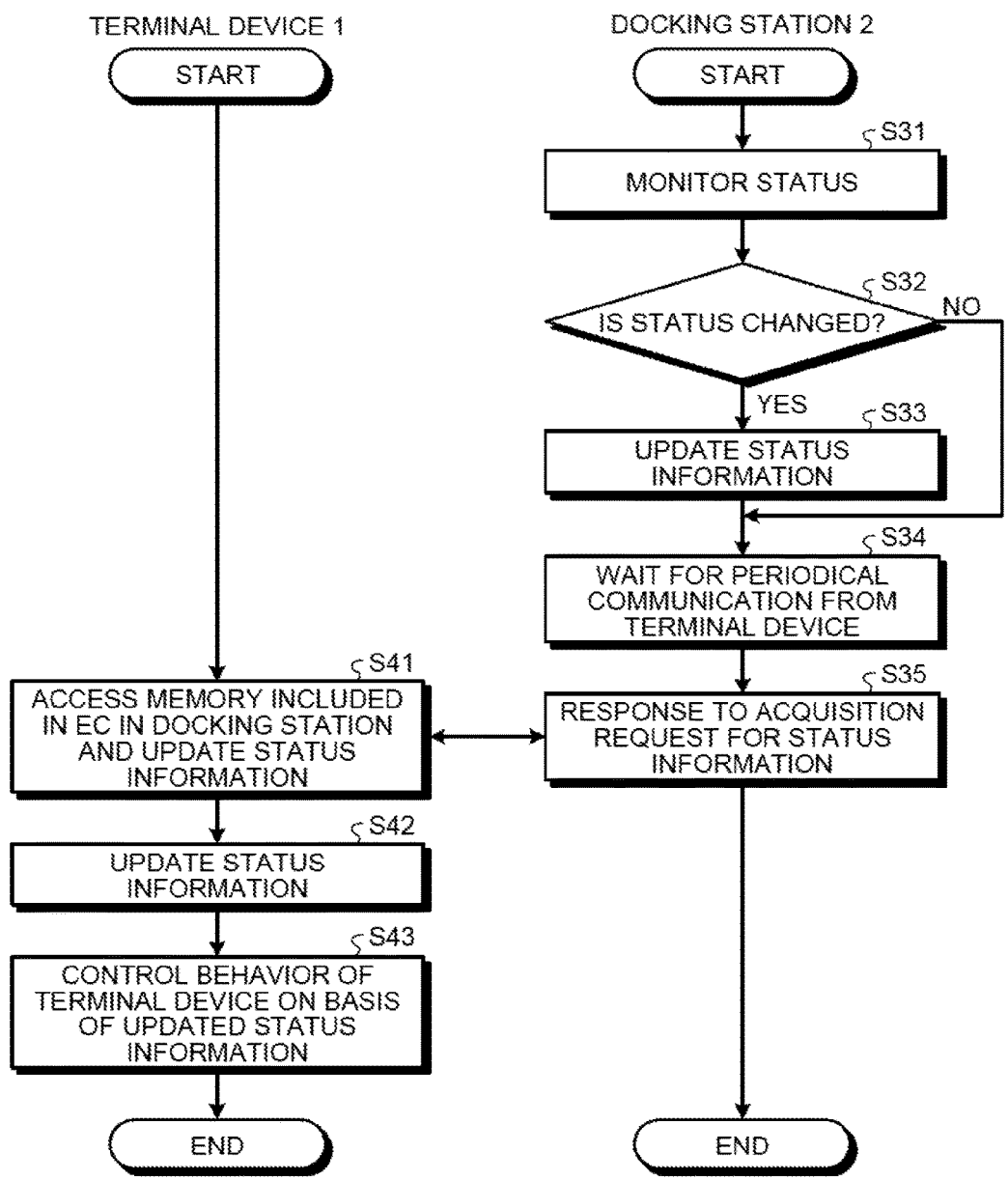
FIG. 13 is a flowchart illustrating the flow of an update process performed on status information on the docking station.

In the following, the flow of the update process of the status information on the docking station according to the embodiment will be described with reference to FIG. 13. FIG. 13 is a flowchart illustrating the flow of an update process performed on status information on the docking station.

The state acquisition unit 221 in the EC 201 in the docking station 2 monitors the status of the docking station 2 including the connection state of the AC adapter 4, the state of the battery 203, and the like (Step S31). Here, in the state of the battery 203, the state indicating whether the battery 203 is connected, a charge state, and the like are included.

Then, the state acquisition unit 221 determines whether the status of the docking station 2 has been changed (Step S32). If the status is not changed (No at Step S32), the EC 201 proceeds to Step S34.

In contrast, if the status has been changed (Yes at Step S32), the state acquisition unit 221 changes and updates the status information on the docking station 2 stored in the storage unit 222 to a status (Step S33).

The storage unit 222 waits for periodical communication output from the EC 101 in the terminal device (Step S34).

Then, the storage unit 222 responses to an acquisition request for the status information on the docking station 2 output from the EC 101 in the terminal device 1 and allows the EC 101 to read the held status information on the docking station 2 (Step S35). Here, the arrows between Step S41 and Step S35 represent an access from the terminal device 1 to the docking station 2 and a response from the docking station 2 to the terminal device 1 performed at Step S41 and Step S35.

In contrast, in the terminal device 1, the state acquisition unit 123 in the EC 101 accesses the storage unit 222 in the EC 201 in the docking station 2 and acquires the status information on the docking station 2 (Step S41).

The state acquisition unit 123 accesses the storage unit 121 and then changes and updates the status information on the docking station 2 stored in the storage unit 121 to the acquired status (Step S42).

Thereafter, the charge setting unit 122 and the power supply management unit 124 control the behavior of the terminal device 1 on the basis of the updated status information on the docking station 2 (Step S43).

Figure 14:
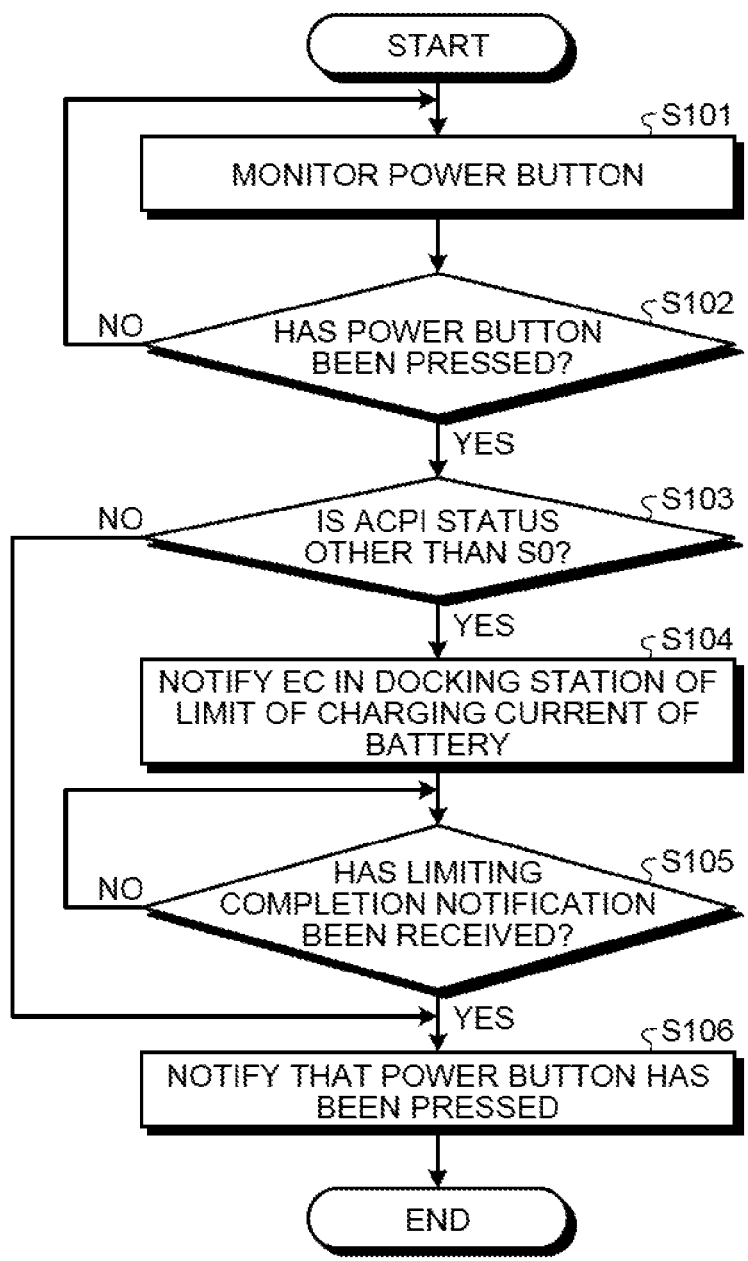

In the following, the flow of the process when the power button in the terminal device according to the embodiment is pressed will be described with reference to FIG. 14. FIG. 14 is a flowchart illustrating the flow of a process performed when a power button of the terminal device is turned on.

The power-on management unit 125 monitors the power button on the basis of the notification from the power button circuit 107 (Step S101).

Then, the power-on management unit 125 determines whether the power button has been pressed (Step S102). If the power button is not pressed (No at Step S102), the power-on management unit 125 returns to Step S101.

In contrast, if the power button has been pressed (Yes at Step S102), the power-on management unit 125 determines whether the ACPI status of the terminal device 1 is other than S0 (Step S103). If the ACPI status is S0 (No at Step S103), the power-on management unit 125 proceeds to Step S106.

If the ACPI status is other than S0 (Yes at Step S103), the power-on management unit 125 notifies the EC 201 in the docking station 2 of the limit of the charging current of the battery 203 (Step S104).

Thereafter, the power-on management unit 125 determines whether a limiting completion notification has been received (Step S105) and, if the limiting completion notification is not received (No at Step S105), the power-on management unit 125 waits until the power-on management unit 125 receives the limiting completion notification.

In contrast, if the limiting completion notification is received (Yes at Step S105), the power-on management unit 125 notifies the CPU 111 that the power button has been pressed (Step S106).

Figure 15:
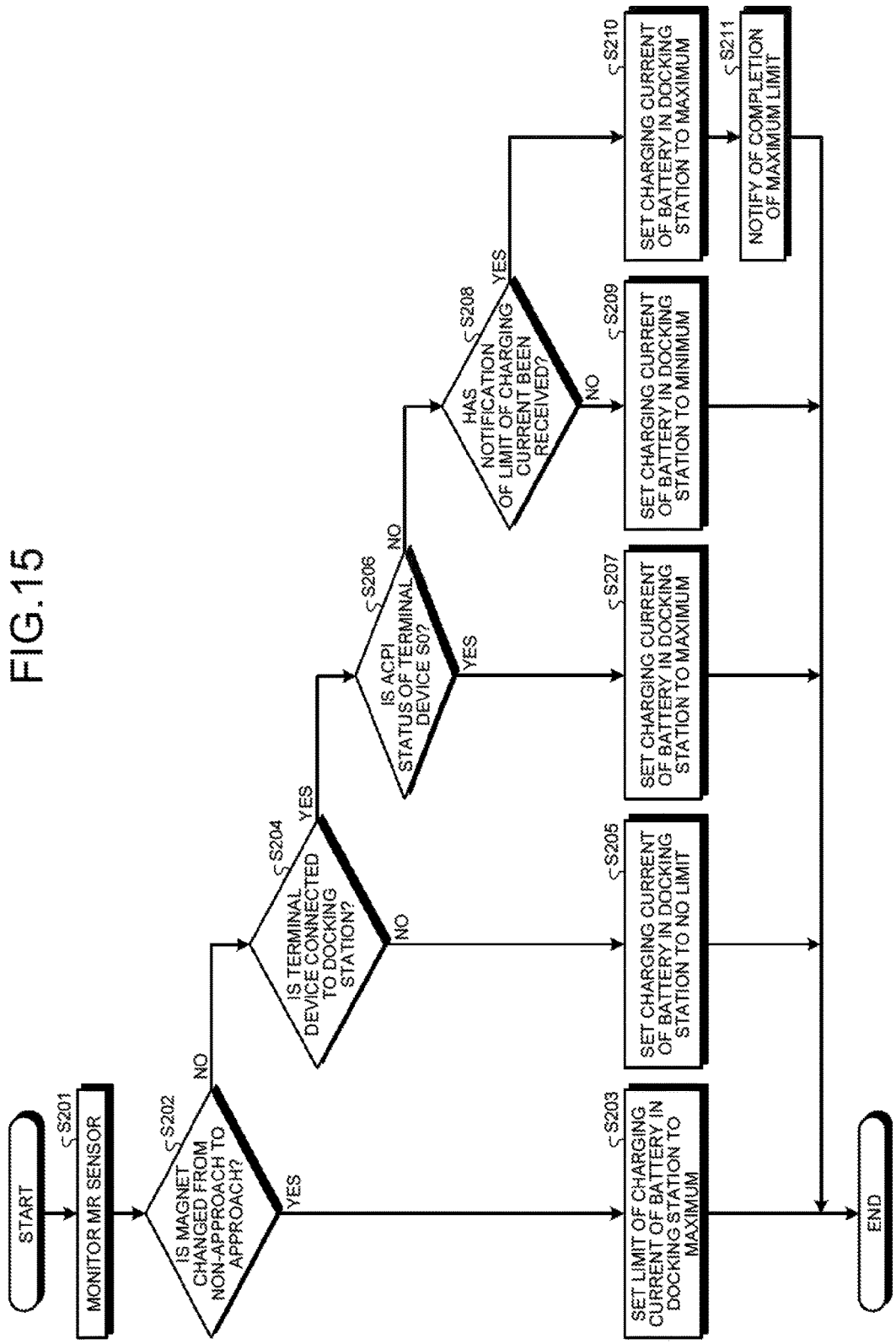
FIG. 15 is a flowchart illustrating the flow of a limit process of the charging current of the battery of the docking station.

In the following, the flow of a limit process of the charging current of the battery 103 in the docking station 2 according to the embodiment will be described with reference to FIG. 15. FIG. 15 is a flowchart illustrating the flow of the limit process of the charging current of the battery of the docking station.

The charge setting unit 224 in the EC 201 monitors detection of the magnet 106 performed by the MR sensor 206 (Step S201).

The charge setting unit 224 determines, on the basis of a notification from the MR sensor 206, whether the magnet 106 approaches, i.e., whether the terminal device 1 approaches the docking station 2 for a connection (Step S202).

If the magnet 106 approaches (Yes at Step S202), the charge setting unit 224 determines that the terminal device 1 approaches the docking station 2 for a connection and sets the limit of the charging current of the battery 203 in the docking station 2 to the maximum (Step S203).

In contrast, if the magnet 106 does not approach (No at Step S202), i.e., if the magnet 106 is not changed from a non-approach to an approach, the charge setting unit 224 determines whether the terminal device 1 is connected to the docking station 2 (Step S204). Here, a case in which the magnet 106 is not changed from a non-approach to an approach includes a case in which a separated state is continued and the non-approach state of the magnet 106 is continued, a case in which the connection state is continued and the approach state of the magnet 106 is continued, and a case in which the docking station 2 is separated from the terminal device 1 and the state of the magnet 106 has been changed from the approach state to the non-approach state.

If the terminal device 1 is not connected to the docking station 2 (No at Step S204), the charge setting unit 224 sets the charging current of the battery 203 to no limit (Step S205).

In contrast, if the terminal device 1 is connected to the docking station 2 (Yes at Step S204), the charge setting unit 224 determines whether the ACPI status of the terminal device 1 is S0 (Step S206).

If the status is S0 (Yes at Step S206), the charge setting unit 224 sets the limit of charging current of the battery 203 in the docking station 2 to the maximum (Step S207).

In contrast, if the status is other than S0 (No at Step S206), the charge setting unit 224 determines whether a notification of the limit of the charging current of the battery 203 has been received from the EC 101 (Step S208).

If the notification of the limit of the charging current of the battery 203 is not present (No at Step S208), the charge setting unit 224 sets the limit of the charging current of the battery 203 in the docking station 2 to the minimum (Step S209).

In contrast, if the notification of the limit of the charging current of the battery 203 is present (Yes at Step S208), the charge setting unit 224 sets the limit of the charging current of the battery 203 in the docking station 2 to the maximum (Step S210).

Thereafter, the charge setting unit 224 notifies the EC 101 in the terminal device 1 of the completion of the maximum limit (Step S211).

Here, in the embodiment, an approach of the terminal device to the docking station is detected by the MR sensor; however, the detection may also be performed by using another method as long as an approach of the terminal device to docking station can be detected. For example, a proximity sensor, a mechanical switch, or the like may also be used to detect an approach of the terminal device to the docking station.

Furthermore, in the embodiment, states are classified into the case of S0 and the cases other than S0; however, another combination may also be used for the combination of the ACPI statuses targeted for the limit as long as the limit of the charging current of the battery is set to the maximum when the state is S0. Furthermore, in the embodiment, the limit of the charging current is notified when, for example, the power button is turned on or the system is started up by using WOL; however, the timing at which the limit of the charging current is notified is not limited to this. Namely, if an operation that can predict an increase in electric power consumption is used, electric power consumption can be reduced to an amount of rated electric power of the AC adapter by starting the operation after the limit of the charging current is notified.

As described above, the terminal device according to the embodiment notifies the docking station that the electric power consumption of the own device is low and makes the limit of the charging current of the battery in the docking station low. Namely, if the electric power consumption of the terminal device is low, the docking station according to the embodiment increases the charging current of the battery. Consequently, it is possible to reduce the time taken to charge the battery in the docking station.

Furthermore, the terminal device according to the embodiment allows the docking station to increase the limit of the charging current of the battery before shifting to a high load state due to an operation performed by the system and then the operation of the system is started. Consequently, even if the load is increased due to the operation performed by the system and electric power consumption is suddenly increased, the total amount of the electric power consumption can be reduced within the amount of rated electric power of the AC adapter.

Furthermore, the docking station according to the embodiment detects an approach of the terminal device before the terminal device is connected and increases the limit of the charging current of the battery in the docking station. Consequently, even if the terminal device that is in the state in which electric power consumption is large is connected to the docking station, the total amount of the electric power consumption can be reduced within the amount of rated electric power of the AC adapter.

Namely, the electronic system that includes therein the terminal device and the docking station according to the embodiment can reduce the time taken to charge the battery in the docking station while maintaining the electric power consumption within the amount of rated electric power of the AC adapter.

According to an aspect of an embodiment of the electronic system, the terminal device, the function expansion device, the power supply management device, and the power supply management program disclosed in the present invention, an advantage is provided in that a battery can be efficiently charged while maintaining electric power consumption within an amount of rated electric power of the AC adapter.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An electronic system comprising:
a first electronic device; and
a second electronic device that is connected to the first electronic device, and that receives an electric power supply from the same power supply as that of the first electronic device, the second electronic device including a battery,
wherein the first electronic device includes:
a load that consumes electric power, and
a processor configured to:
notify, when an amount of electric power consumption of the first electronic device is small, the second electronic device of a small electric power consumption state of the first electronic device,
in response to an instruction to start electric power supply to the load, notify the second electronic device of a limit of a charging current of the battery, and
in response to a limiting completion notification from the second electronic device, cause the electric power supply to the load to be started, and
the second electronic device includes a processor configured to:
decrease, when a notification of the small electric power consumption state of the first electronic device is received, an amount of electric power that can be used to charge the battery in response to receiving a notification of the limit of the charging current of the battery from the first electronic device, and
increase, when a notification of the small electric power consumption state of the first electronic device is received, the amount of electric power that can be used to charge the battery when the notification of the limit of the charging current of the battery is not received.

2. A terminal device comprising:
a load that consumes electrical power, and
a processor configured to:
perform arithmetic processing;
notify, when an amount of electric power consumption of the terminal device is small, another device of a small electric power consumption state of the terminal device, wherein the another device is connected to the terminal device and receives an electric power supply from the same power supply as that of the terminal device; and
in response to an instruction to start electric power supply to the load, notify the another device of a limit of a charging current of a battery of the another device, and
in response to a limiting completion notification from the another device, cause the electric power supply to the load to be started.

3. A function expansion device that consumes electric power supplied from the same power supply as that of a terminal device, the function expansion device comprising:
a processor configured to:
decrease, when a notification that electric power consumption of the terminal device is small is received, an amount of electric power that can be used to charge a battery of the function expansion device in response to receiving from the terminal device a notification that the terminal device receives an instruction to start electric power supply to a load of the terminal device, and then notify the terminal device of a limiting completion notification,
increase, when the notification that the electric power consumption of the terminal device is small is received, the amount of electric power that can be used to charge the battery when the notification that the terminal device receives the instruction to start the electric power supply to the load is not received.

4. The electronic system according to claim 1, wherein the processor of the second electronic device further:
detects an approach of the first electronic device before the first electronic device is connected to the second electronic device, and decreases the amount of electric power that can be used to charge the battery when the approach of the first electronic device is detected.

\* \* \* \* \*